United States Patent
Manchala et al.

[11] Patent Number: 6,088,119
[45] Date of Patent: Jul. 11, 2000

[54] SECURE DOCUMENT REPRINTING

[75] Inventors: Daniel W. Manchala, Torrance; Viswanath Yegnanarayanan, Whittier, both of Calif.

[73] Assignee: Xerox Corporation, Stamford, Conn.

[21] Appl. No.: 08/967,934

[22] Filed: Nov. 12, 1997

[51] Int. Cl.[7] .................................................. G06F 15/00
[52] U.S. Cl. ..................... 358/1.14; 358/1.18; 358/1.15
[58] Field of Search ..................................... 395/113, 117, 395/114, 112, 101; 358/437, 406, 405, 434, 442, 468, 1.14, 1.18, 1.15, 1.13, 1.1; 705/33, 44, 45; 326/8; 235/3, 375, 379; 283/58, 59; 380/55

[56] References Cited

U.S. PATENT DOCUMENTS 5,075,875  12/1991  Love et al. ............................... 395/117
5,720,012   2/1998  McVeigh et al. ......................... 395/113

*Primary Examiner*—Dov Popovici
*Attorney, Agent, or Firm*—Robert Cunha

[57] ABSTRACT

A system for guaranteeing that a defective check is destroyed before a duplicate check is printed. A client terminal is connected to a check printer and a shredder. The client requests a check to be printed. If the printing is defective the check is submitted to the shredder, which destroys the check and enables the printer to print a duplicate. To the extent that the client has a more extensive data base than the printer, the destruction of the check is transmitted to the client as well as the printer. In this case it is the client that instructs the printer to print a duplicate. Finally, to the extent that a network is used for communication between the elements, encryption and passwords may be used for security.

22 Claims, 4 Drawing Sheets

SECURE DOCUMENT REPRINTING

BACKGROUND OF THE INVENTION

In a typical check printing system the operator at a client (terminal) directs the printer to print a check, or a job comprising a number of checks. If a printed check is defective for any reason, the operator may destroy it and print another. A problem is that the operator may fraudulently print duplicate checks, and current printers do not have the capability to detect and prevent this, although some efforts have been made.

One method of dealing with the problem of jammed checks is to provide the printers with a "jam recovery" feature that allows a duplicate check to be printed following a printer jam. This feature is manually enabled by a system administrator who oversees the operator, or by an authorized operator. The problem is that in some cases, even though a jam occurred, the check is printed and is of acceptable quality. In this system, a certain amount of trust by the system administrator or the operator is required.

An example is the Xerox Model 4197 system as shown in FIG. 1. As shown, step 1 shows the normal print command issued from the client 10 to the printer 11. After a check is printed normally, information about the job is recorded in the non volatile random access memory (NVRAM) 12 as a transaction record. The format of the record is shown as follows:

| User ID   | 1 byte   |
|-----------|----------|
| Time Stamp | 6 bytes |
| Check No. | 3 bytes  |
| Payee     | 27 bytes |
| Amount    | 5 bytes  |
| MICR-Line | 22 bytes |
| Status    | 1 byte   |

In the event of a jam, as shown in step 2, a notification is sent from the printer to the client. Step 3 is a command issued from the client 10 to the system administrator 13 or equivalent (which could even be a telephone call) to enable jam recovery for duplicate printing. The system administrator, step 4, clears the NVRAM entry (or enables the entry, in case it is disabled) so that the operator can print a duplicate check. The operator is trusted to void the initial check either by destroying it or by void stamping it. This is shown in Step 5. It is at this step that the operator can misappropriate a check. What is needed is a printer model with enhanced cryptographic hardware and techniques built into the printer to prevent this possibility.

SUMMARY OF THE INVENTION

The best method to prevent fraudulent practice is to make sure that the check is destroyed or voided before a new check is printed. We propose to build a destroyer or check shredder into the printer. This device scans the printed information on the check (the layout and content of this information is explained later) and shreds the check before enabling a reprint of the check. It is possible for someone to print the relevant information on a separate piece of paper, pass that through the shredder, and reprint another check. To prevent this possibility, a magnetic strip is provided on the check. This must also be read by the shredder and the strip information must verify the printed information before a new check can be printed.

DETAILED DESCRIPTION OF THE INVENTION

Figure 1:
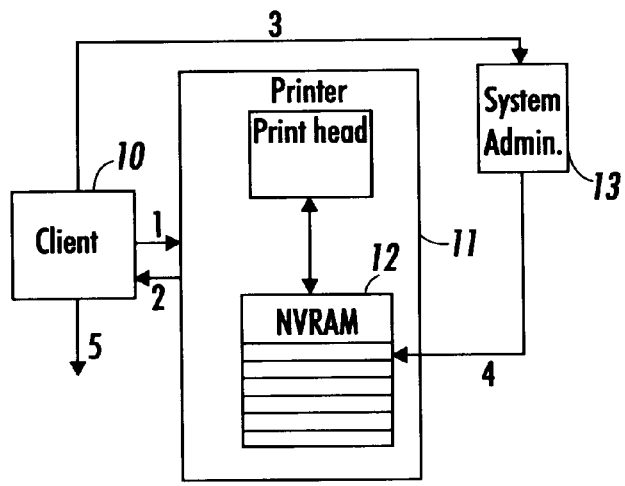
FIG. 1 is a current approach to check printing in the case of a jam.
Figure 2:
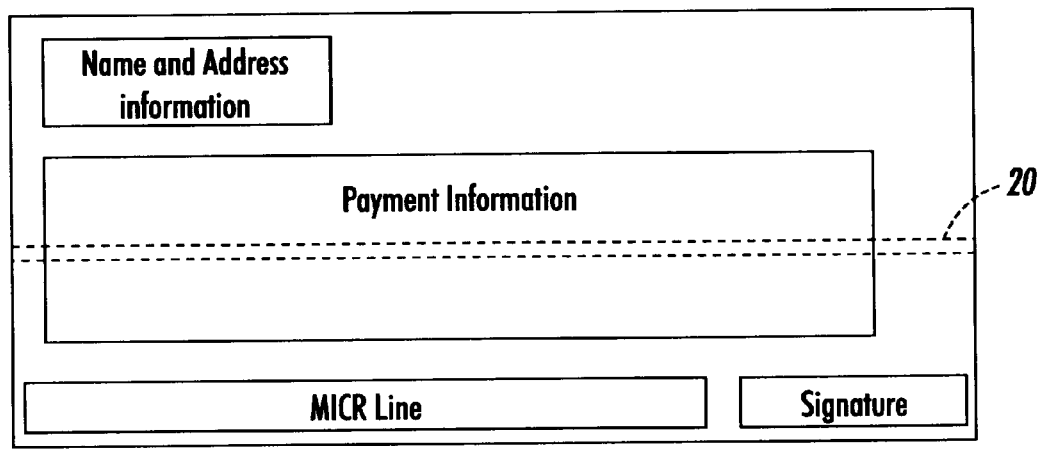
FIG. 2 is shows a magnetic strip on a check.

As shown in FIG. 2, a thin strip of magnetic material 20 runs across the check, on which information can be written to and read from. When the check is printed, pertinent information is entered on the strip. When the check is destroyed, this information is read by the shredder which has a magnetic strip reader attached to it. The magnetic strip is placed on the back side of the check and well above the machine readable printing (MICR) so that it does not interfere with the MICR (magnetic ink character recognition) information when the check is passed through a reader at the local bank. The primary advantage of a magnetic strip is that it is extremely difficult to duplicate magnetic information.

Figure 3:
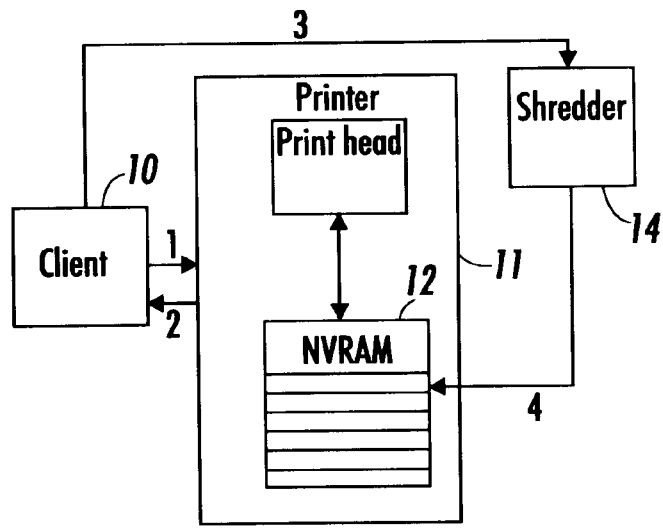
FIG. 3 is a proposed approach to check printing in the case of a jam.

When a check having a magnetic strip gets jammed or smudged, the operator destroys the check by shredding it, thereby enabling the job to be activated again. This process is shown in FIG. 3. Step 1 shows the normal print command issued from the client to the printer. After a check has been printed successfully, information about the job is recorded in the NVRAM as a transaction record. In the event of a need to reprint the check, step 2, a notification is sent from the printer to the client. The operator physically submits the check to the shredder in step 3. The shredder reads the information on the magnetic strip and clears the NVRAM entry (or enables the entry, in case it is disabled) so that the operator can print a duplicate check. This eliminates the need for supervisor intervention. The MICR printer is essentially a self-contained and secure device. Step 4 can be a two way transmission, where the NVRAM communicates back to the shredder that the entry has been erased. This allows the Shredder to maintain a log of confirmed NVRAM deletions.

Figure 4:
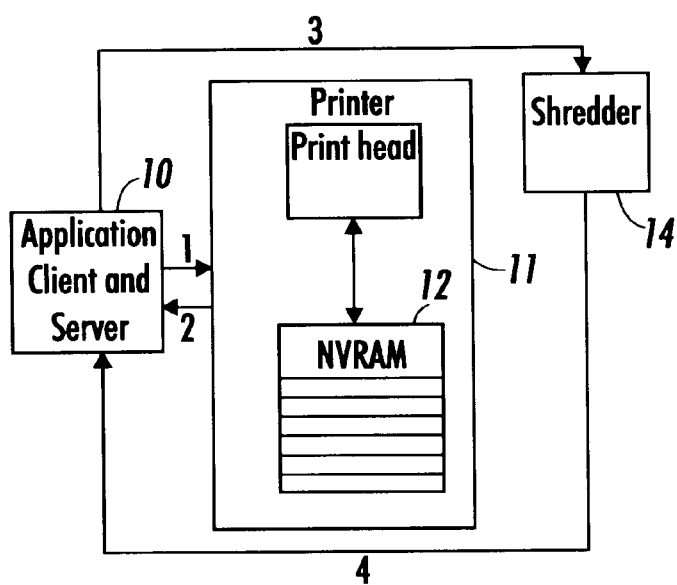
FIG. 4 is a cryptographic solution including monitoring at the application level.

Employing a magnetic strip to prevent fraudulent check printing is useful only as long as data in the NVRAM 12 is valid. However, this does not prevent a determined operator from printing checks fraudulently after the contents of the NVRAM are cleared by the system administrator. In addition, placing a device on a network introduces the risk of wiretapping. To address these security issues, a complete cryptographic solution can be built into the check printing application and tied into the printer. A system is shown in FIG. 4. This figure assumes that the printer 11, application client 10 and shredder 14 are connected by a network to enable all of the steps. This arrangement allows the client access to a data base which can be much larger than the NVRAM.

The normal print command is issued from the client application to the printer. After a check has been printed successfully, information about the job is recorded in the NVRAM as a transaction record. In the event of a jam, a notification is sent from the printer 11 to the client 10. The operator submits the check to the shredder 14 which reads the information on the check and verifies the rights of the operator for shredding. This information could be in encrypted format. The shredder disables the no-print flag in the client application for further reprint.

This information, all of the fields of a single record in the NVRAM, could be encrypted and written onto the magnetic strip portion of the check. The encrypted information is read by the magnetic strip reader of the shredder which decrypts the information upon the operator's entry of his/her password or PIN number and enables the reprint flag in the NVRAM. One reason to make the operator enter the PIN/password is to provide a secure way to disable the no-print flag. Another reason to mandate the operator's entry of the password/PIN before the shredder can be made to shred the information is to prevent unauthorized persons from destroying checks and reprinting them under a different name.

Two additional cases must be considered. One is when the magnetic strip portion of a check is destroyed during a jam, the other is when toner runs low and a plain check is produced while the application indicates that a check has been printed. Both cases need a secure technique for a successful reprint.

In the first case, when the magnetic strip is destroyed, and the shredder cannot read this information (and therefore does not destroy it), the check should be approved for a reprint from a higher authority such as the system administrator, and should be void stamped. Approval for reprint could be done securely by disabling the no-print flag using secret sharing techniques. These techniques help the printer/application to form a secret quantity that will disable the no-print flag. A simple way of forming this secret quantity is by XOR-ing each of the secrets entered by the higher authorities (managers of the operator, system administrators, etc.). A similar method should be employed for the second case of low toner. The operator may identify the check through the check number, and notify the proper authorities to disable the no-print flag when they bring up the corresponding record using the client application. In the absence of a client application, the authorities could disable the no-print flag from the control panel of the printer by entering the check number information. The client application should contain a higher authority enable-disable flag for each record. This flag carries the security context related to the authority when he/she logs on.

Figure 5:
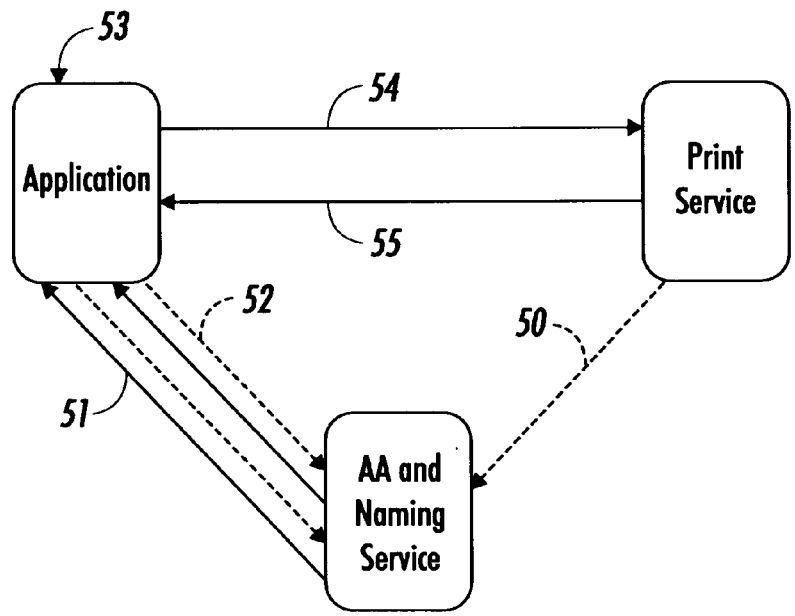
FIG. 5 is a print'reprint scenario for MICR check printing.

An example of how to print a check to the MICR printer using an operating system or a computing environment like DCE (Distributed Computing Environment) is shown in FIG. 5. Assume that information about the print service is located in the directory/naming service as shown in step 50. The print service consists of a print spooler, the NVRAM and the shredder.

51. The user logs in to acquire a security context (ticket).

52. The client application 53 (the check printing application logged into by the operator) requests a ticket for the print service from the security service (part of the network operating system). The client uses the information stored in the directory/naming service to locate the print service.

53. The client application verifies that the operator has the access rights to print a particular check. If this check has been printed earlier, a flag is enabled to prevent further printing. The flag can be disabled only by the shredder or by the system administrator. Other ways of disabling the flag are discussed below. Initially, this flag is in the disabled state.

54. The client application authenticates the print service. The ticket acquired in step 52 will be sent to the print service. Other print job information that will allow a check to be printed, and the check contents, are also sent to the print service. The print service verifies the ticket and the client application's (this includes the operator's login context) access rights, and prints the check if the operator has the necessary rights. It also writes into the magnetic strip the NVRAM record, and the operator's login information, all encrypted using a secret key between the operator and the AA (Authentication and Authorization) service.

55. The print service sends information to enable the no-print flag.

Figure 6:
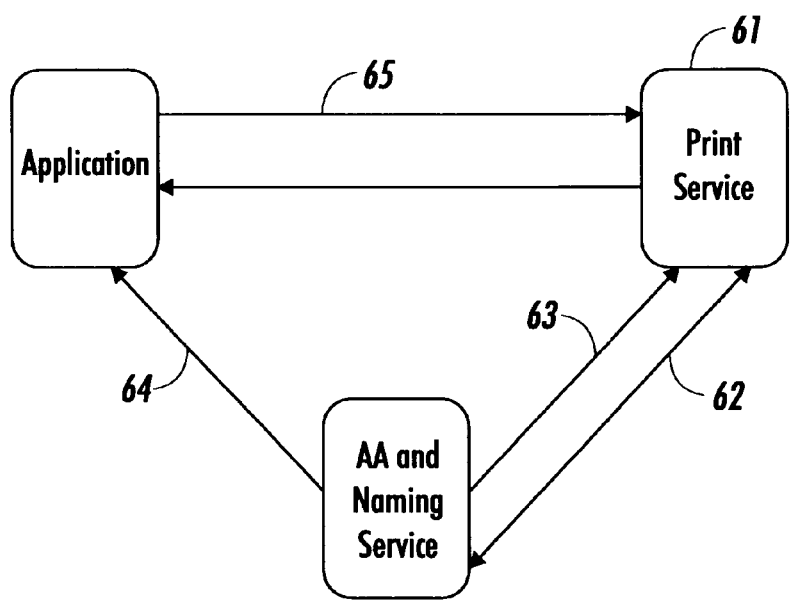
FIG. 6 is a shred and reprint scenario for MICR Check printing.

Now let us consider how the no-print flag is disabled when a jammed check is destroyed using a shredder. The following steps, as shown in FIG. 6, describe this process.

61. The print service 61 includes the operator, spooler and shredder. The user enters a PIN/password at the shredder to activate it. The shredder reads the encrypted information using a magnetic strip reader attached to it.

62. The shredder sends user information to the AA service in order to authenticate the AA service. This is explained in greater detail below. The shredder also sends the encrypted information to the AA service.

63. The AA service authenticates the shredder and the operator using the login information it received from the shredder, and verifies to see if the operator has the access rights to destroy a particular check. If so, it sends information to the shredder to shred the check.

64. The AA service decrypts the print information sent from the shredder, and a message is sent to the client application to disable the no-print flag corresponding to that account.

65. Reprint the check.

Figure 7:
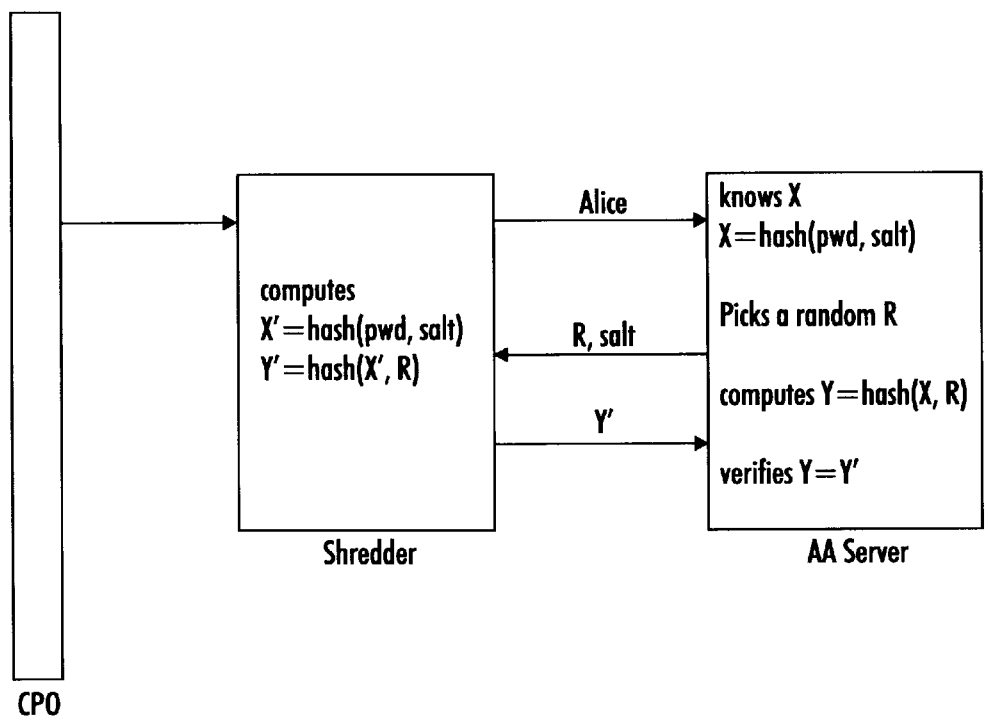
FIG. 7 shows the authentication between the shredder and the AA server.

Authentication between the shredder and the AA server is normally not provided by the operating system because of the difficulty in installing a client version of the operating system on the print service. Difficulty arises because the print service has real time needs for printing, and also because of limited size/space of disk storage and the need to have a separate processor for the operating system. For this reason, a hand shake mechanism between the shredder (part of the print service) and the AA service similar to the one used in Novell Netware 3.0 was devised. This is explained in FIG. 7, and essentially is step 2 of FIG. 6.

The operator logs in using his/her user name ("Alice"), id and password on the shredder (part of the print service). The shredder sends the login name to the AA server. The AA server knows a quantity X which was a precomputed hash of the operator's password and salt. Standard hashing functions like MD2/5 or SHA could be used for this purpose. It picks a random challenge R and sends it along with the salt to the shredder. The shredder computes a hash of the password and salt sent from the AA server, and forms X', which should equal X. It then calculates Y' which is a hash of X' and the random challenge sent by the AA server. The AA server also performs the same operation on its side and calculates Y. This should equal Y' calculated by the shredder. When the shredder sends in Y' across to the AA server, the server compares this quantity with its calculated value of Y and if it satisfies the equality, confirms the operator to be allowed to proceed to step 63 of FIG. 6.

Figure 8:
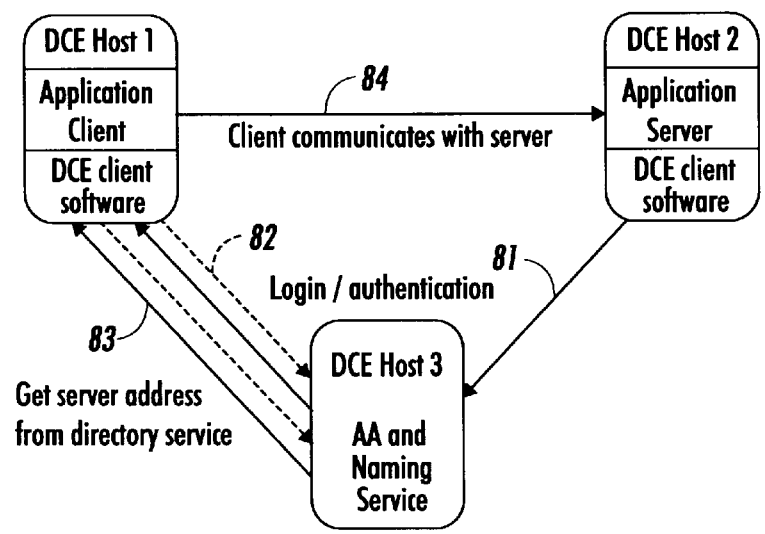
FIG. 8 shows the relationship between the application client and server.

In the case of MICR printing, the application client is a graphical user interface that leads from a login/password session to a screen of data containing data items like name of the operator, name of the payee, amount, data, address of the payee, MICR line contents, check number, job number and the no-print flag. The no-print flag is initially off and is switched on (enabled) when a check is printed. It is disabled again after the check has been destroyed. This can be shown in a window as an up/down flag. The application server is a database containing several records, only one of which can be seen at a time using the client application. Before the application client can print a check, it needs to connect with the application database. This set of steps is shown in FIG. 8.

81. When the application server starts on Host 2, it automatically stores information about its network address in the DCE directory service.

82. An operator on Host 1 logs in, and the user's process gets authentication (security context), storing it for later use.

83. When the operator starts the application on Host 1, the application uses the DCE client software to search the directory service for information about the location of the application server. The directory service returns the application server information to the application client.

84. The application client uses the information from the directory service to communicate with the application server. The application client uses the user's authentication information to prove its identity to the application server.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system for enabling the secure reprinting of duplicate documents comprising a client on which an operator generates a print request to print a document,
    a printer, responsive to the print request, for printing the document by
        a) determining if this request is for a first print or an authorized reprint, if either,
        b) attempting to print the contents of the document on a paper medium in a form that is not optically copyable,
        c) if step b) was not successful and a reprint is required, submitting the document produced in step b) by the operator to a means for destroying the document,
    the means for destroying also for
        d) reading the contents of the document,
        e) destroying the document, and
        f) sending the contents read in step d) to the printer to be used to authorize a reprint, and
    whereby the printer will reprint the same document only if the contents have been received from the means for destroying as an authorized reprint.

2. The system of claim 1 wherein the print request generated by the client and the contents from the means for destroying sent to the printer are encrypted.

3. The system of claim 1 wherein said document is a check.

4. The system of claim 1 or 2 wherein the means for destroying comprises a shredder.

5. The system of claim 1 wherein the contents of the document is stored on a magnetic strip.

6. A system for enabling the secure reprinting of duplicate documents comprising a client on which an operator generates a print request to print a document,
    a printer, responsive to the print request, for printing the document by
        a) determining if this request is for a first print or an authorized reprint, if either,
        b) attempting to print the contents of the document on a paper medium in a form that is encrypted and not optically copyable,
        c) if step b) was not successful and a reprint is required, submitting the document produced in step b) by the operator to a means for destroying the document,
    the means for destroying also for
        d) reading the contents of the document,
        e) destroying the document, and
        f) sending the contents read in step d) to the client to be used to authorize a reprint,
    whereby the client will generate an authorization for the reprint, and
    whereby the printer will reprint the same document only if the contents have been received from the means for destroying as an authorized reprint and if an authorization is received from the client.

7. The system of claim 6 wherein the printer also transmits to the client that the document was printed after attempting to print.

8. The system of claim 6 wherein any signal sent between the client, the printer, or the means for destroying are encrypted.

9. The system of claim 6 wherein the document is a check.

10. The system of claim 6 or 8 wherein the means for destroying comprises a shredder.

11. The system of claim 6 wherein the contents of the document is stored on a magnetic strip.

12. A system for enabling the secure reprinting of duplicate documents comprising a client on which an operator generates a print request to print a document comprising:
    a printer and a means for destroying the document,
    the printer, responsive to the print request, for printing the document by
        a) determining if this request is for a first print or an authorized reprint, if either,
        b) attempting to print the contents of the document on a paper medium in a form that is not optically copyable, and
        c) if step b) was not successful and a reprint is required, submitting the document produced in step b) by the operator to the means for destroying the document, and
    the means for destroying for
        d) reading the contents of the document,
        e) destroying the document, and
        f) sending the contents read in step d) to the printer to be used to authorize a reprint,
    whereby the printer will reprint the same document only if the contents have been received from the means for destroying as an authorized reprint.

13. The system of claim 12 wherein the print request generated by the client and the contents from the means for destroying sent to the printer are encrypted.

14. The system of claim 12 wherein said document is a check.

15. The system of claim 12 or claim 13 wherein the means for destroying is a shredder.

16. The system of claim 12 wherein the contents of the document is stored on a magnetic strip.

17. A system for enabling the secure reprinting of duplicate documents comprising:

a client on which an operator generates a print request to print a document comprising, a printer and a means for destroying the document, the printer, responsive to the print request, for printing the document by,
   a) determining if this request is for a first print or an authorized reprint, if either,
   b) attempting to print the contents of the document on a paper medium in a form that is encrypted and not optically copyable, and
   c) if step b) was not successful and a reprint is required, submitting the document produced in step b) by the operator to the means for destroying the document, and the means for destroying for
   d) reading the contents of the document,
   e) destroying the document, and
   f) sending the contents read in step d) to the client to be used to authorize a reprint.

18. The system of claim 17 wherein the printer also transmits to the client that the document was printed after attempting to print.

19. The system of claim 17 wherein any signal sent between the client, the printer, or the means for destroying are encrypted.

20. The system of claim 17 wherein the document is a check.

21. The system of claim 17 or claim 19 wherein the means for destroying is a shredder.

22. The system of claim 17 wherein the contents of the document is stored on a magnetic strip.

* * * * *